Oct. 29, 1968     F. DOVE     3,407,654
TAKE-OFF DIRECTOR
Filed Nov. 1, 1966     2 Sheets-Sheet 1

INVENTOR.
FRANK DOVE
BY
*S.C. Yeaton*
ATTORNEY

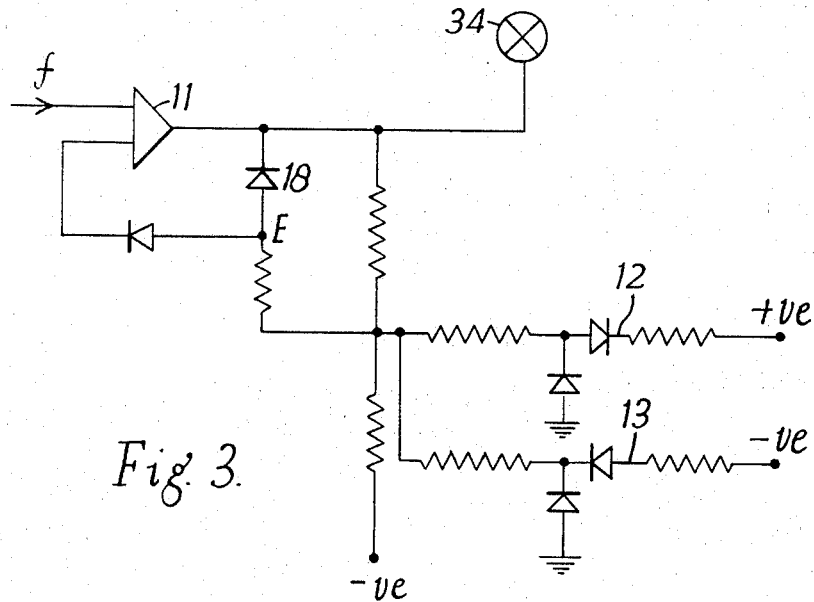

3,407,654
TAKE-OFF DIRECTOR
Frank Dove, St. Albans, England, assignor, by mesne assignments, to Sperry Rand Limited, London, England, a company of England
Filed Nov. 1, 1966, Ser. No. 591,155
Claims priority, application Great Britain, Nov. 3, 1965, 46,515/65
5 Claims. (Cl. 73—178)

ABSTRACT OF THE DISCLOSURE

An aircraft flight instrument for directing an aircraft during the take-off maneuver to initially climb rapidly to a predetermined height, then accelerate rapidly while maintaining that height, and then climb rapidly again with provision for abnormal situations.

---

This invention relates to an aircraft flight instrument for use by a pilot during take-off. As described and claimed in our co-pending patent application Ser. No. 456,223 filed May 17, 1965, and issued Mar. 5, 1968 as U.S. Patent No. 3,371,528, an aircraft flight instrument has means for indicating the deviation from a predetermined optimum proportional relationship between the acceleration and the pitch attitude whereby a null reading of the indicating means defines a desired accelerating and climbing flight. This invention provides a modification or improvement of the instrument claimed in application No. 456,223 whereby the said optimum relationship is changed dependent on aircraft position and/or power developed.

The take-off director instrument as for instance described with reference to FIGURES 1 and 2 of said patent application No. 456,223 has one electrical signal, representing pitch attitude $\theta$ and a second electrical signal $f$ which is the output from an accelerometer mounted in a fixed attitude in the aircraft to be sensitive to accelerations along the longitudinal axis of the aircraft and also to the pitch attitude. Either or both of these signals are subjected to a multiplication before being algebraically summed to produce a resultant deviation signal $\lambda$, which should during a normal take-off be maintained equal to zero by the pilot using the elevator control only in order to vary the pitch attitude while maximum power is developed. The factor or factors by which the signals are multiplied clearly determines the relative weighting given to the pitch attitude and acceleration in the optimum relationship expressed by the director law:

$$f - b\theta = \lambda = 0$$

where $b$ is the effective multiplication factor. By adjusting $\theta$, the available power is therefore shared between producing acceleration and gaining height in a ratio depending on the value of .

The relevant long term equations governing aircraft motion are:

$$\frac{\dot{v}}{g} = \frac{T-D}{mg} - \gamma$$

and $$\theta + \alpha_0 = \alpha + \gamma$$

where:
$\dfrac{\dot{v}}{g}$ = acceleration along flight path
$T$ = thrust
$D$ = drag
$\gamma$ = flight path angle
$\alpha_0$ = angle of incidence at datum speed
$\alpha$ = angle of incidence at actual speed
$mg$ = weight Since $f$ is sensitive to the attitude as well as the acceleration of the aircraft, it includes a function of pitch attitude as well as acceleration and:

$$f = \frac{\dot{v}}{g} + \theta$$

Re-arranging terms from the four equations set forth above:

$$\gamma = \frac{T-D}{bmg} + \frac{(b-1)}{b}(\alpha_0 - \alpha) \tag{1}$$

$$\frac{\dot{v}}{g} = \frac{(b-1)(T-D)}{bmg} - \frac{(b-1)}{b}(\alpha_0 - \alpha) \tag{2}$$

$$\frac{\dot{v}}{g} + \theta = f = \frac{T-D}{mg} - (\alpha_0 - \alpha) \tag{3}$$

It can be seen from Equation 1 that the flight path climb angle $\gamma$ varies with factor $b$ and that for increasing values of $b$ this angle is reduced.

From Equation 2 it can be seen that when $b=1$, acceleration is zero and as $b$ is increased acceleration increases.

From Equation 3 it is seen that $f$ also represents for a given airspeed a function of the surplus of thrust over drag, which surplus power is available to be apportioned between acceleration and climb. The difference $(\alpha_0 - \alpha)$ between actual incidence angle or angle of attack at the speed under consideration and the datum incidence angle, is small, and for practical purposes the fusilage-mounted longitudinal accelerometer may be regarded as giving a direct measure of the surplus thrust available.

As described in said U.S. application Ser. No. 456,223, the value of $b$ was normally maintained constant, for instance at 1.4 throughout normal take-off, reverting to a value of 1.0 giving zero acceleration only if available thrust were drastically reduced. The normal take-off therefore follows a smooth curve with a constant $b$. However, it is now considered desirable that instead of following such a smooth curve, the aircraft should follow a path having different phases, for instance as shown in FIGURE 1 of the accompanying drawings, the aircraft in a first phase climbing rapidly at substantially constant speed until a predetermined phase change-over height $h_c$, e.g. 400 feet is reached, then in a second phase maintaining height while speed builds up to a predetermined phase change-over speed Vc, then in a third phase climbing again. Such a take-off presents a compromise between the various requirements of gaining height quickly for obstacle clearance, obtaining sufficient speed for safety requirements, obtaining speed as quickly as possible for efficient climb operation, and noise abatement procedures.

Changing of the optimum relationship as determined by the flight director, according to this invention, is arranged so that the aircraft can be directed to carry out these different flight phases, each separate phase of the path being subject to its own respective optimum relationship.

Specific embodiments of means for varying the optimum relationship are illustrated in the accompanying drawings, in which:

FIGURE 3 is a second circuit diagram comprising a second embodiment, and

FIGURE 4 is a logic table showing the operation of the circuit of FIGURE 2.

The intention of both circuits is to set the proportions of excess thrust given to climbing and to acceleration respectively according to the height and speed of the aircraft. The circuit of FIGURE 2 is intended to be used in conjunction with the flight director shown in FIGURES 1 and 2 of said application Ser. No. 456,223. Although in said FIGURE 1 the multiplication factor $b$ is shown as operating on the pitch attitude signal, it will be appreciated that an equivalent proportional effect can be obtained by multiplying the accelerometer signal by $1/b$, and in both embodiments at present described this is what is done.

Figure 1:
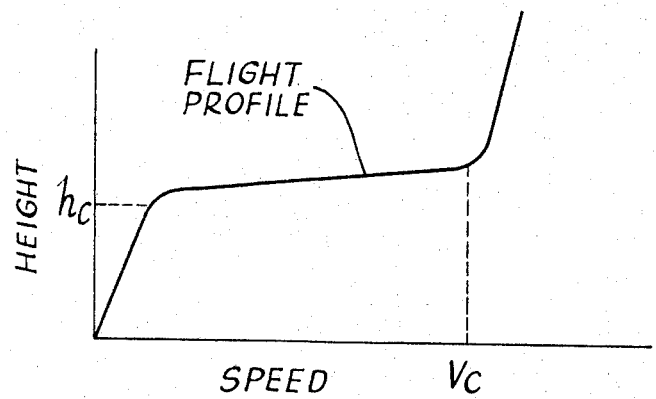
FIG. 1 is a graph showing the take pattern which the present invention aids an aircraft to maintain has been inserted.
Figure 2:
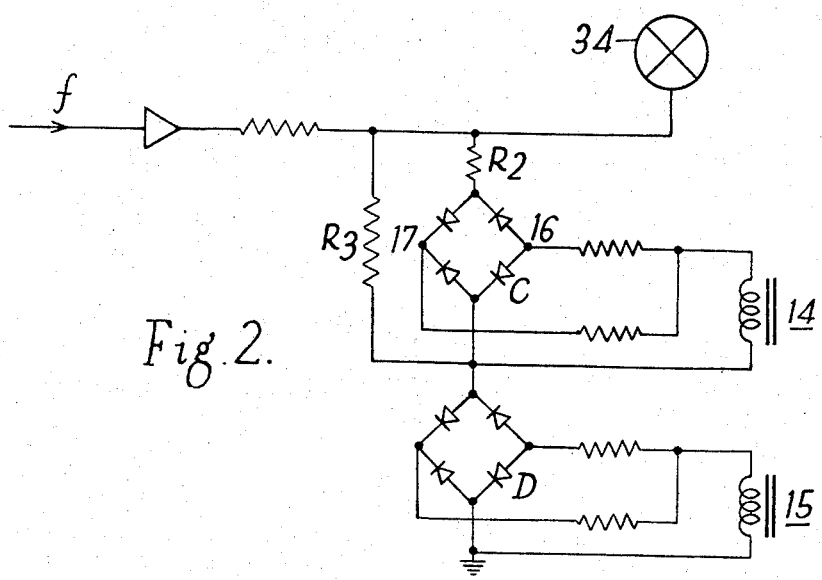
FIGURE 2 is a first cricuit diagram comprising a first embodiment.

The circuit of FIGURE 2 is in use added to that of FIGURE 1 of said U.S. application Ser. No. 456,223 to operate on the acceleration signal $f$ before it is applied to summation device 34. Reference A.C. voltages representing actual measured height and actual measured speed are applied via transformers 14 and 15 across series connected bridges C and D respectively, each bridge comprising four diodes.

Considering first the action of bridge C alone. The height-representing alternating voltage is applied through transformer 14 to diagonally opposed "corners" 16, 17 of the bridge. It will be seen that the arrangement of the diodes is such that when the applied voltage is positive all four corners of the bridge are biased positively, and when the applied voltage is negative, all four corners are biased negatively. When the height-representing voltage is in phase with the accelerometer signal $f$, the bridge C is at all times biased so as to prevent the passage of the accelerometer signal $f$, i.e. it presents an "open circuit" to the accelerometer signal which therefore passes unchanged to summation device 34. When the height-representing voltage is 180° out of phase with the accelerometer signal $f$ then current is passed from corner 16 to attenuate the signal $f$ by an amount dependent on the value of a resistance $R_2$.

The height-representing signal is arranged (e.g. by suitable setting of a datum) so that when it represents heights of less than 400 ft. it is in phase with an accelerometer signal $f$, representing forward acceleration but for heights of more than 400 ft. it is 180° out of phase with such an accelerometer signal. If there is a power reduction, consequent reduction in the accelerometer signal below a datum point will cause the accelerometer signal to reverse its phase. The bridge C then represents a short circuit at heights below 400 ft. to this accelerometer signal which is accordingly attenuated. Similarly at heights above 400 ft. the bridge represents a short circuit.

The speed-representing voltage applied to bridge D is arranged to be of opposite phase to normal accelerometer signals for speeds below 250 kts., and to go through zero to the opposite phase when speed builds up above 250 kts. This bridge therefore presents a short circuit to normal accelerometer signals until speed builds up to 250 kts. The bridge is connected to the accelerometer signal by the bridge C (when it is short circuited). A comparatively large resistance $R_3$ however allows leakage around bridge C when it is open-circuit. Above 250 kts. the bridge presents an open circuit and does not affect the accelerometer signal.

When the accelerometer signal drops below its datum as described above, so that the phase is changed, bridge D represents an open circuit below 250 kts. and a short circuit above 250 kts.

The separate and combined actions of the two bridges can be seen from the logic table of FIGURE 4. In this table each square is divided diagonally into two triangles. In the upper triangle is shown the effect for accelerometer signals related to normal forward acceleration, and in the lower triangle is shown the effect for below datum accelerometer signals.

When the aircraft first takes off it is in the maximum height increasing phase, the height is less than 400 ft. and the velocity is less than 250 kts. From the table it is seen that in this condition, for normal accelerometer signals, the combined bridge effect is open circuit, but that because bridge D is a short circuit, there is a small leakage through resistance $R_3$ causing slight attenuation of the signal. The value of $R_3$ is in one case chosen such that the effective value $b$ is 1.4, the aircraft in consequence following a steeply climbing path accompanied by some acceleration.

Since the plane is very near the ground, a stall must at all costs be avoided. Should the accelerometer signal therefore fall below its datum or become negative so that the accelerometer signal changes phase, in both cases the combined bridge condition becomes open circuit, bridge D being open circuit so that no leakage through $R_3$ occurs. The value of $b$ is therefore unity. Since the negative accelerometer signal passes to summation device 34 virtually unattenuated, the flight director now calls for a negative pitch attitude, i.e. a dive, to maintain speed and avoid stalling.

When the aircraft reaches 400 ft. but is still below 250 kts. speed, it enters the speed-increasing phase and the combined bridge condition for "positive" accelerometer signals become short circuit. The maximum attenuation of the accelerometer signal is therefore applied, dependent on the value of $R_2$. $R_2$ may be chosen such that the effective value $b$ is 20. This gives very little climb but a high acceleration rate.

When the speed increasing phase has continued for long enough for the speed to increase to 250 kts., the aircraft enters a final climb-out phase. For normal accelerometer signals, the combined bridge condition is open circuit, bridge D being also open circuit so that no leakage through $R_3$ occurs. The value $b$ is therefore unity and the maximum climb angle with no acceleration is followed. At or during this phase, the pilot will normally reduce his throttle setting so that less power is available, and the aircraft will not climb so steeply as in the first phase.

Since the aircraft height and speed are now greater, stall avoidance is not of quite such prime importance, so should a major power failure involve the accelerometer signal becoming negative, the combined bridge condition becomes open circuit, with some leakage through $R_3$ since bridge D is short circuit. As described above $R_3$ is such as to give a value of $b=1.4$, so that the negative signal is slightly attenuated and the aircraft follows a path with reduced climb angle with consequently less deceleration. Should the power failure, however, be so great that the reduced climb angle is insufficient to halt the deceleration and the speed drops below 250 kts. the value of $b$ drops to 1 and all the available power is given to maintaining speed at the expense of height if necessary.

The choice of the phase change-over values of height and speed is dependent on the particular aircraft and on the flight profile it is desired to follow. The choice of values of $b$ also effects the relative steepness of the profile in the various flight phases. The action of a rate demand limiter (not shown) in the flight director prevents the changes in $b$ from commanding abrupt changes in the attitude, so that as shown in FIGURE 1, the difference flight phases follow smoothly one from another.

It may also be desired to adjust the change-over values of height and speed for particular airfields or flight conditions. For this, the voltage representing height and speed are obtained from synchros connected to the synchros of an Air Data Unit (not shown). Adjustment of the synchros can then alter the points at which the voltages change phase.

The circuit of FIGURE 3 is suitable for use in a flight director in which the accelerometer signal $f$ is a D.C. signal. The signal $f$ is amplified in D.C. amplifier 11. Direct voltages varying linearly with height and speed respectively are applied to Zener diodes on lines 12 and 13.

The circuit works on the principle that a positive control voltage applied at point E drives the amplifier 11 in a negative direction (i.e. to reduce the gain). Positive outputs from the amplifier are reduced to zero by such a positive control voltage. Negative outputs from the amplifier will, however, remove the positive voltage from point E, by passage through diode 18, so that the negative output is not so reduced to zero.

The D.C. voltage representing height on line 12 is positive, but for values representing heights less than 400 ft. is prevented by its Zener diode from being applied to point E. At the value representing 400 ft. however the resistance of the Zener diode breaks down and the positive voltage reaches point E.

At heights of 400 ft. and above therefore positive acceleration signals are reduced to zero. The D.C. voltage representing airspeed on line 13 is negative, and at values representing less than 250 kts. is prevented by the Zener diode from reaching point E. At values representing 250 kts. and above the Zener diode breaks down and the negative voltage opposes the positive voltage applied by the height signal.

Thus below 400 ft. and 250 kts. the amplifier 11 is arranged to have an amplification giving a value of $b=1.4$, there being no control signal at point E. Above 400 ft. the acceleration signal is reduced to zero point E being positive, giving a very large value of $b$, and above 250 kts. point E being neutral or negative, no control signal is applied to the amplifier and the value of $b$ reverts to 1.4.

The examples described above both obtain their acceleration information from a fusilage mounted accelerometer, the output signal $f$ from which therefore includes a function of pitch altitude $\theta$. This is taken into account in the director law $f=b\theta$. It will however be appreciated that where an acceleration signal $\dot{v}/g$ independent of pitch attitude can be obtained, this can be used in place of the accelerometer signal $f$, the value of $b$ being suitably adjusted. For example, instead of $f=1.4\theta$, the director law becomes $\dot{v}/g=0.4\ \theta$.

What is claimed is:

1. An aircraft flight instrument for directing an aircraft through a plurality of flight phases including a first take-off phase in which the aircraft climbs rapidly to a predetermined height and a second take-off phase in which the aircraft accelerates rapidly to a predetermined air speed while maintaining height, said instrument having error sensing means having connections to receive signals representing aircraft acceleration and pitch attitude and adapted to derive therefrom an error signal representing the deviation from a set optimum proportional relationship between the received signals, director means connected to receive said error signal, flight phase detecting means having connections for receiving flight information representing actual height and airspeed, and proportion adjusting means co-operating with said flight phase detecting means and said error sensing means and operative to adjust the set optimum proportion to a value directing a maximum pitch attitude during said first flight phase and to a value directing a maximum acceleration during said second flight phase.

2. An instrument as claimed in claim 1, providing also for a third flight phase at heights and airspeeds above said predetermined value in which the aircraft climbs again, said proportion adjusting means being operative to adjust the set optimum proportion to a value directing maximum pitch attitude during this flight phase.

3. An aircraft flight instrument for directing an aircraft through a plurality of flight phases, said instrument having error sensing means having connections to receive electrical signals representing aircraft acceleration and pitch attitude and adapted to compare said electrical signals and to derive from the comparison an electrical error signal representing the deviation from a set optimum proportional relationship between the received signals, director means connected to receive said error signal and to command flight alterations in the sense to reduce said error signal to zero, flight phase detecting means having connections for receiving electrical information signals representing aircraft height and airspeed, and proportion adjusting means comprising an electrical multiplying means connected to said error sensing means to operate on one of the signals received by the error sensing means before said comparison is made, said multiplying means having variable gain means connected to said flight phase detecting means to be set according to the flight phase.

4. An instrument as claimed in claim 3, wherein said electrical multiplying means is an A.C. attenuation circuit having first and second bridges connected in series and in that order between a line carrying said acceleration-representing signal and earth, said flight phase detecting means being connected to apply an A.C. signal representing height across a diagonal of said first bridge and an A.C. signal representing airspeed across the diagonal of said second bridge, said attenuation circuit also having a leakage resistor connected in parallel with said first bridge.

5. An instrument as claimed in claim 3, wherein said electrical multiplying means has a variable gain amplifier connected in series in a line carrying said acceleration-representing signal, the gain circuit of the amplifier being connected to be selectively energised from said flight phase detecting means which includes Zener diodes connected to have said flight information signals representing aircraft height and airspeed applied thereto, the characteristics of the Zener diodes being chosen to prevent application of the said flight information signals to said gain circuit until the signals are amplitudes representing said predetermined height and airspeed respectively.

References Cited

UNITED STATES PATENTS

| | | | |
|---|---|---|---|
| 3,200,642 | 8/1965 | Neuendorf et al. | 73—178 |
| 3,309,923 | 3/1967 | Bishop et al. | 73—178 |
| 3,313,153 | 4/1967 | Greene | 73—178 |
| 3,359,793 | 12/1967 | Kendall et al. | 73—178 |

S. CLEMENT SWISHER, *Acting Primary Examiner.*

NEIL B. SIEGEL, *Assistant Examiner.*